Aug. 27, 1968  F. F. FOLMER  3,398,651
SAFETY LATCH FOR A FLUID POWERED WORK CYLINDER
Filed March 18, 1966
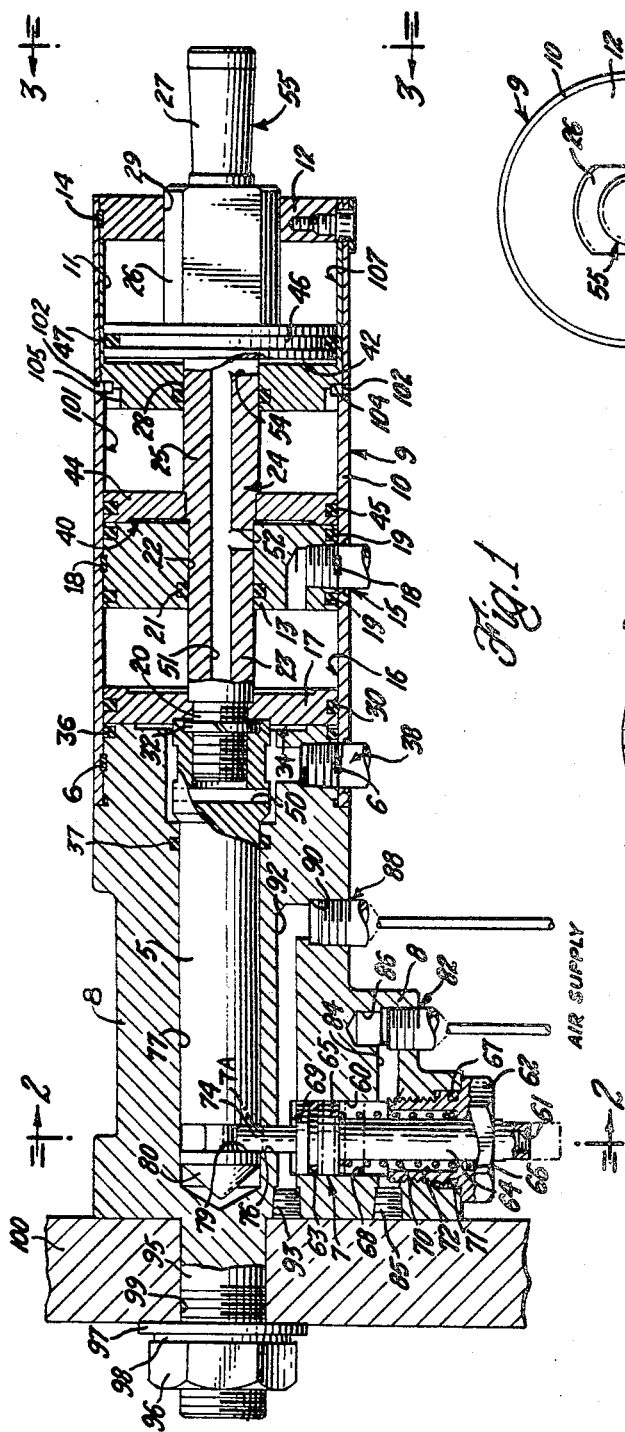
INVENTOR.
FRANK F. FOLMER
BY
William L. Fisher
HIS ATTORNEY

United States Patent Office 3,398,651
Patented Aug. 27, 1968

3,398,651
SAFETY LATCH FOR A FLUID POWERED WORK CYLINDER
Frank F. Folmer, Roseville, Mich., assignor to Savair Products Co., Warren, Mich., a corporation of Michigan
Filed Mar. 18, 1966, Ser. No. 535,427
2 Claims. (Cl. 92—27)

ABSTRACT OF THE DISCLOSURE

Improvements are disclosed in fluid powered work cylinders of the type useful in the resistance welding art comprising air powered safety latch means for protection of the operator of the welding machine in which the work cylinder is incorporated, said safety latch means comprising an air powered double acting latch piston and an air circuit therefor which is separate and independent of the fluid work circuit for the work piston, said safety latch means latching the work piston in its return position and exclusively controlling the initiation of each power stroke of the work piston.

---

This invention relates to fluid powered work cylinders particularly for use in the resistance welding art.

Its object is to provide such a cylinder with a truly practical and entirely reliable safety latch by which the piston may be latched in its return position for the protection of the operator of the machine in which the work cylinder is incorporated.

In the resistance welding art a spot welding machine may incorporate a plurality of fluid powered welding work cylinders which bring welding electrodes to the work to carry out individual spot welding operations. Operators have been known to lose a hand in such machines because of the force with which the electrodes are brought to the work. My safety latch when incorporated in such work cylinders eliminates such accidents as will be explained in the following description from which the foregoing object of the invention and its advantages will appear. In the drawings which accompanying this application:

FIG. 1 is a side elevational view partly in section of a pneumatic work cylinder provided with my safety latch;

FIG. 2 is a sectional view of FIG. 1; and

FIG. 3 is a front end elevational view of said cylinder.

Referring to the drawings in greater detail, my safety latch comprises a piston rod extension 5 and a piston assembly, generally designated 7, which is incorporated in a cylinder head 8 of a fluid powered work cylinder which, in the instance, is an air cylinder, generally designated 9, having a cylinder sleeve 10 fitted at its rear end unto the cylinder head 8 and carrying a sleeve cup 11 at its front end. A retaining ring 6 is used to secure the cylinder head 8 and the sleeve 10 together. The cup 11 is held in the sleeve 10 by a bushing 12 secured by a retaining ring 14 and a pair of screws (only one of which is shown) to the sleeve 10. The latter carries a center section 13 which is drilled as shown to form with a cooperating pipe tap in the sleeve 10 a return port 15 which opens to a chamber 16 on the return side of a piston member 17. The center section 13 which is secured in the sleeve 10 by a retaining ring 18 is fitted with O-rings 19 which are compressed by the sleeve 10 and with an O-ring 21 which is compressed by a section 23 of a piston rod which has other sections 25, 26 and 27. The section 23 slides in a central bore 22 of the center section 13; the section 25 slides in a central bore 28 of the cup 11; and the section 26 slides in a central bore 29 of the bushing 12. The piston member 17 is fitted over the rear end 20 of the piston rod section 23 and carries an O-ring 30 which is compressed by the sleeve 10. Such rear end 20 of the section 23 threadably engages the front end of the piston rod extension 5 which carries a lock washer 32 and bears against the piston member 17 which in turn bears against a shoulder formed on the section 20. Another chamber 34 is formed on the forward side of the piston member 17 by the cylinder head 8 which carries an O-ring 36 compressed by the piston rod extension 5 and which is drilled as shown to form with another cooperating pipe tap in the sleeve 10 a forward port 38 which opens to the chamber 34. The chamber 34 communicates with two other chambers 40 and 42 formed, respectively, on the forward sides of piston members 44 and 46 which are fitted with O-rings 45 and 47, respectively. Such communication is via a transverse aperture 50 formed in the piston rod extension 5, a longitudinal aperture 51 formed in the piston rod sections 23 and 25 and transverse apertures 52 and 54 formed, respectively, in such sections 23 and 25. The piston member 44 is press fitted on the forward end of the section 23 and bears against a shoulder formed by the section 25. The piston members 17, 44 and 46 and the piston rod 24 move as a unit which is hereinafter referred to as the piston 55. The piston 55 is non-rotating by virtue of flats formed on the section 26 which cooperate with flats in the bushing 12. The cylindrical section 27 is formed with a back taper to facilitate attachment of a welding point holder (not shown) for holding a welding electrode.

The piston assembly 7 is slidably disposed in a bore 60 which is formed in the enlargement shown of the cylinder head 8 and its piston 65 divides such bore into two chambers 68 and 69 on the forward and return sides, respectively, of the piston 65. A nut 62 is threadably engaged in the outer end of the chamber 60 and slidably supports one end of a piston rod 64 attached to the piston 65 of the piston assembly 7. The outer end of the rod 64 is tapped as at 61 for purposes which will appear hereinafter. The nut 62 is fitted with an O-ring 66 compressed by the rod 64 and an O-ring 67 compressed by the walls of an enlargement 71 at the outermost end of the chamber 60 beyond its threaded portion. A compression spring 70 concentrically disposed about the piston rod 64 extends into a cavity 72 in the nut 62 and operates against the piston 65 to bias it toward the inner end of the chamber 60. The piston 65 carries an O-ring 63 which is compressed by the walls of the chamber 60 and also a piston rod 74 which operates in a transverse aperture 76 formed in the cylinder head 8 inwardly of the chamber 60. The aperture 76 intersects a longitudinal bore 77 in the cylinder head 8 in which the piston rod extension 5 operates. When the latter is in its return position shown in full lines the free end of the piston rod 74 projects into an annular recess 79 in the rear end of the piston rod extension 5. A conical surface 80 formed on the extreme rear end of the extension 5 serves to cam the piston rod 74 out of the way of the extension 5 as the latter moves into its return position. A forward port 82 for the piston assembly 7 is formed in the cylinder head by a longitudinal aperture 84 plugged by a pipe plug 85 which intersects the chamber 60 on the forward side of the piston 65 and by a transverse aperture 86 which is drilled and pipe tapped. A return port 88 for the piston assembly 7 is similarly formed by a drilled and tapped transverse aperture 90 and by a longitudinal aperture 92 plugged by a pipe plug 93 which aperture 92 also intersects the chamber 60 but on the return side of the piston 65.

In use of my invention the work cylinder 9 is mounted on a machine where it is to be used, such as a spot welding machine, by the mounting structure on the rear of the cylinder head 8 which comprises a stud shaft 95 and a jam nut 96 threadably engaged thereon. A flat washer 97 and a lock washer 98 are assembled on the shaft 95 ahead of the nut 96. The shaft 95 is made to project through a bore 99 in a suitable part 100 of the particular machine and the nut 96 is tightened against the washers 97 and 98 to cause the rear of the cylinder head 8 to bear solidly against the machine part 100. As is well known in this art the forward and return ports 38 and 15, respectively, of the work cylinder 9 are piped through air hoses and suitable valving (not shown), such as a solenoid-controlled 4-way valve, to a source of pressure air which is admitted alternately to the forward and return ports 38 and 15 to initiate, respectively, the forward and return strokes of the piston 55. The pressure air which is admitted to the forward port 38 enters the chamber 34 and the chamber 42 via the transverse aperture 50 in the piston rod extension 5, the longitudinal aperture 51 and the transverse aperture 54 in the piston rod section 23 to start the piston 55 on its forward or power stroke. Pressure air also enters the chamber 40 via the transverse aperture 52 when the latter leaves the bore 22 in the central section 13 after commencement of the power stroke of the piston 55. The air in the chamber 16 in front of the piston member 17 is exhausted out of the return port 15. The air in front of the piston member 44 which is contained in a chamber designed 101 is exhausted out of the cylinder sleeve 10 by a vent 102 therein which communicates with intersecting apertures 104 and 105 in the cup 11. The air in front of the piston member 46 which is contained in a chamber designated 107 is vented outside of the bushing 12 by slots (not shown) therein. The position of the piston 55 in the cylinder 9 at the completion of its forward or power stroke can be anywhere between the returned position shown in FIG. 1 and a bottomed position (not shown) where the piston members 17, 44 and 46 would bottom, respectively, against the center section 13, the sleeve 11 and the bushing 12 depending upon the position of the work for the particular application. To return the piston 55 from its forward position after completion of its forward stroke pressure air is admitted to the return port 15 and enters the chamber 16 to move the piston member 17 and hence the entire piston 55 to the left as viewed in FIG. 1 until the piston members 17, 44 and 46 bottom, respectively, against the cylinder head 8, the center section 13 and the sleeve 11 in the return position of the piston 55 as shown in FIG. 1. In this return stroke the air in the chamber 34 behind the piston member 17 is exhausted directly out of the return port 38; the air in the chamber 40 and in the chamber 42 behind the piston members 44 and 46, respectively, is exhausted out of the return port 38 via the transverse apertures 52 and 54, the longitudinal aperture 51 and the transverse aperture 50. Closing off of the transverse aperture 52 by its entrance into the bore 22 near the end of the return stroke cushions the piston 55 as the air in the chamber 40 must be compressed as the piston 55 moves into its return position.

To commence the power stroke of the piston 55 by the admission of pressure air to the forward port 38 my safety latch must first be actuated to retract the piston assembly 7 to its retracted position shown in dotted outline in FIG. 1 and indicated at 7A therein. This is accomplished by directing pressure air to the chamber 69 on the return side of the piston 65 and exhausting the air in the chamber 68 on the forward side which causes the piston 65 to move against the spring 70 to its return position 7A. This retracts the piston rod 74 out of engagement with the annular recess 79 of the piston rod extension 5 and out of the bore 77 and thus frees the piston 55 to move in its power stroke. The forward and return ports 82 and 88 of my safety latch are piped as is well known in this art through air hoses and suitable valving (not shown) to a source of pressure air. Such valving for my safety latch is arranged so that pressure air is normally directed to the forward port 82 which maintains the piston assembly 7 in its forward position shown in full lines in FIG. 1 so that the piston rod 74 is in its extended position in the bore 77. With the piston rod 74 in its extended position whenever the piston 55 is in its return position the rod 74 is engaged in the annular recess 79 and the piston 55 is latched in its return position. Such valving for my safety latch is also arranged so that the machine operator must have both of his hands free of the machine for use at the same time to simultaneously actuate a pair of manually operated electrical push buttons or valves to direct pressure air to the return port 88 of my safety latch and to exhaust air from the forward port 82 so as to actuate the piston assembly 7 to its retracted position 7A. Without the machine operator carrying out this procedure the piston assembly 7 will always remain in its extended position because of pressure air being maintained in the chamber 68 and because of the spring 70 which will function even in the event of failure of supply of such pressure air to the forward port 82. When the machine operator carries out this procedure and the piston assembly 7 is actuated to its retracted position to unlatch the piston 55 the solenoid of the 4-way valve for the cylinder 9 distributing pressure air to the forward and return ports 38 and 15 is signalled electrically either by the increased pressure in the air line to the return port 88 by virtue of the pressure air therein which actuates a pressure switch (not shown) in such air line or by a pin (not shown) threadably engaged in the tapped aperture 61 in the outer end of the piston rod 64 which actuates a limit switch (not shown) upon movement of the piston assembly 7 to its retracted position. Upon such signaling of the solenoid of the 4-way valve for the cylinder 9, pressure air is directed to the forward port 38 to carry out the forward or power stroke of the piston 55 which is free to move by virtue of such retraction of the piston rod 74. Upon release by the machine operator of such manually operated push buttons or valves pressure air is directed to the forward port 82 of my safety latch and air is exhausted from the return port 88 to return the piston assembly 7 to its extended position in which the piston rod 74 projects into the bore 77. In this instance the piston rod 74 does not engage the annular recess 79 since the piston rod extension 5 moved out of the rear end of the bore 77 during the forward or power stroke of the piston 55 which was initiated upon retraction of the piston assembly 7. The piston rod 74 projects into the bore 77 during the time the piston 55 remains in its forward position and even though it does so during the time the piston 55 is being returned to its return position by the normal sequencing of the solenoid-controlled 4-way valve for the cylinder 9 it does not hinder such return of the piston 55 since it is cammed out of the path of movement of the piston rod extension 5 by the conical surface 80 on the rear end thereof. Such camming action takes place during the last part of the return stroke of the piston 55 against the action of the spring 70 and by compression of the pressure air in the chamber 68 to move the piston rod 74 out of the bore 77 into its retracted position. As soon as the piston 55 reaches its return position the annular recess 79 is aligned with the piston rod 74 which moves by the action of the spring 70 and the re-expansion of the pressure air in the chamber 68 into engagement with such recess to latch the piston 55 in its return position in the cylinder 9. My safety latch will hold the piston 55 in its return position against all eventualities, as for example, accidental admission of pressure air to the forward port 38 of the cylinder 9, until and unless the machine operator goes through a procedure similar to that described to positively unlatch my safety latch.

It will thus be seen that there has been provided by the present invention a safety latch for a fluid powered work cylinder in which the foregoing object of the present invention together with many thoroughly practical advantages has been successfully achieved. Various modifications may be made without departing from the ambit of the invention as defined by the appended claims.

What is claimed is:

1. In a fluid powered work cylinder of the type useful in the resistance welding art having a double acting work piston powered in alternate forward power and return strokes between a forward work position and a fixed return position by a fluid work circuit, air powered safety latch means for protection of the operator of the welding machine in which the work cylinder is incorporated, said safety latch means comprising an air powered double acting latch piston having a forward position and a retracted position and an air circuit therefor which is separate and independent of said fluid work circuit, said safety latch means exclusively controlling the initiation of each power stroke of the work piston by maintaining the latch piston in its forward position latching the work piston in its return position until reversal of said air circuit whereby to unlatch the work piston by actuation of the latch piston to its retracted position, said safety latch means latching the work piston in its return position, said air circuit including means for maintaining the latch piston in its forward position by pressurized air during each of the power and return strokes of said work piston except for actuation of the latch piston from its forward position and back again via the work piston moving into its return position upon completion of its return stroke, the latching of the work piston in its return position by said safety latch means occurring axially in respect to the piston rod of said work piston, said work piston having a rearwardly and axially projecting piston rod extension, and cooperating cam means between said piston rod extension and said latch piston for camming the latch piston out of the way of said piston rod extension as said work piston moves into its return position, such camming action upon the latch piston occurring by compression of the pressurized air maintaining the latch piston in its forward position.

2. The improvement in fluid powered work cylinders as claimed in claim 1 in which said safety latch means is provided with spring means in addition to said air circuit for maintaining said latch piston in its forward position.

References Cited

UNITED STATES PATENTS

| | | | |
|---|---|---|---|
| 825,866 | 7/1906 | Rogers | 92—110 X |
| 1,115,605 | 11/1914 | Snohr | 92—27 X |
| 2,130,618 | 9/1938 | Gnavi | 92—27 X |
| 2,493,875 | 1/1950 | Hunter | 92—27 |
| 2,661,599 | 12/1953 | Folmer | 92—110 X |
| 3,033,171 | 5/1962 | Engelbrecht et al. | 92—27 X |
| 3,175,473 | 3/1965 | Boteler et al. | 92—130 X |
| 3,182,566 | 5/1965 | Berg et al. | 92—24 |
| 3,195,309 | 7/1965 | Cripe | 92—24 X |
| 695,675 | 3/1902 | Ebel | 92—18 X |

FOREIGN PATENTS 244,866   2/1926   Italy.

MARTIN P. SCHWADRON, *Primary Examiner.*

I. C. COHEN, *Assistant Examiner.*